United States Patent [19]

Christy et al.

[11] 4,160,263
[45] Jul. 3, 1979

[54] DUAL OR MULTIPLE OBJECTIVE VIDEO MICROSCOPE FOR SUPERIMPOSING SPACED IMAGES

[75] Inventors: Harold Christy, Phoenix; Robert R. Bernham, Apache Junction, both of Ariz.

[73] Assignee: George R. Cogar, Frankfort, N.Y.

[21] Appl. No.: 905,576

[22] Filed: May 15, 1978

[51] Int. Cl.² .............................................. H04N 9/02
[52] U.S. Cl. ......................................... 358/1; 358/93; 358/101; 358/107
[58] Field of Search ................. 358/1, 41, 56, 88, 93, 358/101, 107, 209, 225, 226

[56] References Cited
U.S. PATENT DOCUMENTS

| | | | |
|---|---|---|---|
| 3,784,738 | 1/1974 | Natter | 358/88 |
| 3,908,077 | 9/1975 | Stut et al. | 358/101 |
| 4,042,960 | 8/1977 | Wooding, Jr. | 358/101 |

*Primary Examiner*—Richard Murray
*Attorney, Agent, or Firm*—Harry M. Weiss

[57] ABSTRACT

This disclosure relates to a video microscope with wide potential range of magnification powers, including but not limited to from 10× to 1000× whose separate images originating from multiple objective lenses are combined on a half-silvered mirror and focused into a vidicon camera tube to produce a two dimensional composite image. Separation of the multiple objective lenses can be adjusted with a preloaded right-hand/left-hand lead screw arrangement without defocusing the image from either lens system. A third image such as a cross hair, grid pattern or graticule can be introduced via a light source which is projected on a silicon semiconductor wafer or other subjects through the objective lenses and in turn reflects as a composite image onto the face plate of the vidicon camera tube. The third projected image permits measurement of areas and linear dimensions of the subjects viewed. Digital null reference electronic techniques in the video output also is disclosed for auto correlation of images using servo controls. Selective deletion of scanning lines on a CRT viewing screen also provides a convenient means of measuring the vertical dimensions of subject matter being viewed, where the magnification in use in the system is accurately known. The viewed subjects are displayed on the cathode-ray tube (CRT) screen in a true relationship without image inversion, reversal or left-right ambiguity. Means are also disclosed for projecting an electronically generated image or laser beam onto the subject matter being viewed for optical printing or altering (i.e. trimming) the subject.

30 Claims, 4 Drawing Figures

DUAL OR MULTIPLE OBJECTIVE VIDEO MICROSCOPE FOR SUPERIMPOSING SPACED IMAGES

BACKGROUND OF THE INVENTION

1. Field of the Invention

This invention relates generally to video systems, and more particularly, relates to video microscopes for comparing objects or images which can, for example, be used for aligning and locating the kerf between integrated circuit or discrete device chips formed in a silicon wafer.

2. Background of the Prior Art

In the past, fabrication of integrated circuit or discrete device chips from a single semiconductor wafer required the necessary step of separating the integrated circuit chips or, as the case may be, the discrete device chips. This separation step usually was known as a "sink and break" operation. In some cases a slurry saw was used to separate the chips without a sinking operation.

Several types of optical alignment systems are being used for positioning silicon wafers under a high speed diamond saw generally used for scribing circuit wafers. These prior art systems are all derivations of the binocular comparison microscope which was designed to superimpose two nearly identical images in registration for the purpose of examining image differences, if any.

Optical projection rather than viewing systems have been developed to reduce operator fatigue caused by the need to observe the work area through binocular eyepieces for extended periods. It should be observed that optical projection requires large aperture objective lenses, a high intensity light source and a complex arrangement of lenses and a projection screen which usually required a basic redesign of the work unit such as the alignment or processing machine.

There is also a limit to the intensity of visible and accompanying infrared light which can be projected onto work objects such as silicon wafers without risk of modifying their characteristics. Thus, optical projection systems designed for semiconductor wafer alignment usually have to be viewed in subdued light.

Accordingly, a need existed for a simplified object viewing or processing arrangement or a silicon wafer alignment system which provides a bright, sharp image from a comparatively low intensity light source and which can be easily incorporated into a wafer scoring or other micro viewing machine without extensive modifications. A need also existed for a projection system where the reproduced image of the viewed subject could be located to best serve the operator's requirements and where the reproduced image can be repeated at a supervisory position or elsewhere as often as desired.

SUMMARY OF THE INVENTION

Accordingly, it is an objective of this invention to provide an improved apparatus and method for comparing objects.

It is another object of this invention to provide an improved means of accurately aligning the margins or kerf areas between integrated circuits or discrete components on a silicon wafer for further processing by the scoring or scribing saw.

It is another object of this invention to provide an improved apparatus and method for providing alignment information of two or more superimposed images on a bright viewing screen of convenient size at a location which best serves the needs of the operator.

It is a further object of this invention to provide a means of laterally positioning two or more objective lenses over an object such as a silicon wafer or any focal plane surface with backlashfree differential screw controllers.

It is a still further object of this invention to provide an apparatus which has means to fix any objective lens of a multiple lens system over a point on the object's focal plane surface and move other objective lenses to desired points on the object's viewing plane with a simple screw controller mechanism.

It is still another object of this invention to provide an optical system with sufficient depth of focus to accommodate limited vertical variations in an essentially flat image and with inherent mechanical stability to produce a two dimensional image and to make refocusing and/or readjustment unnecessary during normal usage.

It is a still further object of this invention to provide an optical system which keeps the optical path length between viewing plane and a vidicon face plate constant between the outer and inner limits of the objective lenses regardless of whether multiple lenses are moved simultaneously, or only one objective lens is moved with respect to the other objective lenses.

It is a still further object of this invention to provide an optical system which facilitates projection of an accurately ruled grid pattern or linear scale on the focal plane surface of an object which will permit measurement of areas and linear dimensions of objects.

It is still another object of this invention to take advantage of the bilateral nature of optical transmission paths which will permit substitution of a small commercially available mini-CRT for a small commercially available vidicon and permit projection of two or more micro images on a focal plane surface, thus permitting a video microscope to be used as a micro printer for exposing silicon wafers or other light sensitive material or objects.

Alternatively, by installing an additional image splitter in series with the vidicon optical input, it is another objective of this invention to project the image from the mini-CRT onto the focal plane surface while viewing the result on the vidicon output screen.

It is a still further object of this invention to use the unused half of an image splitter to project another image from the subject plane surface or some other image source onto a vidicon face plate.

It is still another object of this invention to utilize, as an alternate to the mini-CRT projector of an optical system, a medium powered YIG or Niobium invisible output laser which can, for example, be used in a trimming operation.

The foregoing, and other objects, features, and advantages of the invention will be apparent from the following, more particular description of the preferred embodiment of the invention, as illustrated in the accompanying drawing.

Figure 1:
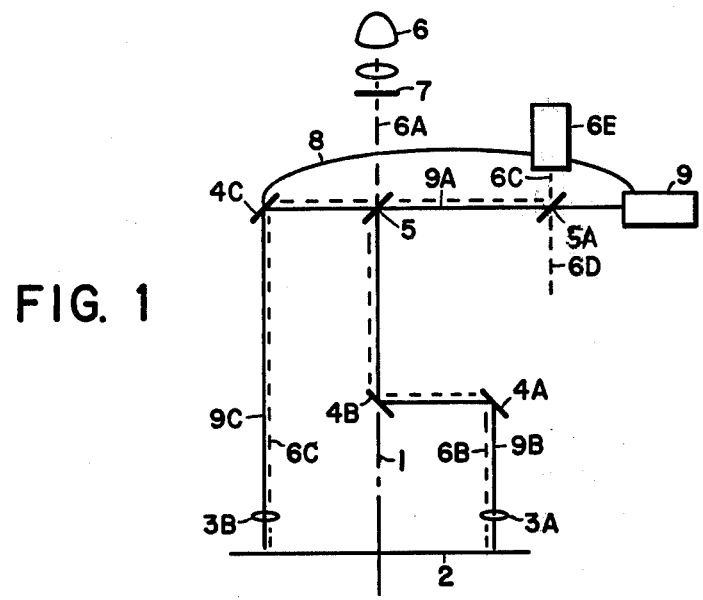
FIG. 1 is a schematic diagram of the optical path through the dual or multiple objective video microscope of this invention from the right and left objective lens to the vidicon tube and from the light source to the illuminated area on each side of the object's turntable.

Referring to the schematic diagram of the optical paths shown in FIG. 1, the image on the right side of centerline 1, which is the centerline of a silicon wafer (not shown), turntable 2, passes through an objective lens 3A thence to a plane mirror 4A, to plane mirror 4B and to a half-silvered image-splitting mirror 5 which reflects the right side image from lens 3A into a vidicon tube 9. This path is shown by line 9B/9A.

The image on the left side of the centerline 1 is brought into focus from the wafer turntable 2 by objective lens 3B. The image then goes to plane mirror 4C, reflected through half-silvered mirror 5 to the vidicon tube 9. The optical path for the left image is shown by line 9C/9A.

A light source with condensing lens 6 is installed on the microscope centerline 1. The parallel beams from light source and lens system 6 go through the half-silvered mirror 5 to the plane mirror 4B, then to the plane mirror 4A, through the right side objective lens 3A to illuminate an area equal to the field of vision of the right microscope image. The path of the light source and lens system 6 to the right-hand image is shown by line 6A/6B. The image-splitting properties of the half-silvered mirror 5 reflect light from the combined light source and lens system 6 to mirror 4C, thence to the objective lens 3B which illuminates the field on the left-hand side of the video microscope. The path from the combined light source and lens system 6 to the left-hand image is shown by line 6A/6C.

A line grid, linear scale, cross-hair or secondary image can be projected simultaneously on the right and left side of the wafer turntable 2 by introducing a prepared slide at 7, below the condensing lens combined with light source 6. The projected image from the slide 7 is reflected in focus via optical paths 9C and 9B to 9A and to the vidicon tube 9.

A rigid mechanical linkage couples the vidicon tube 9 to the mirror 4C is indicated by reference numeral 8. The purpose of the rigid mechanical linkage 8 is to keep the optical path length uniform from the wafer turntable 2 through the objective lenses 3A and 3B to the vidicon tube 9 throughout lateral adjustment of the objective lenses 3A and 3B from their inner and outer limits of spacing from the centerline 1. The location of the centerline 1 and the position of the image-splitting mirror 5 and the combined light source and lens 6 is unchanged by adjustment of the objective separation lead screw (not shown in FIG. 1) which moves the objective lenses 3A and 3B laterally.

Figure 2:
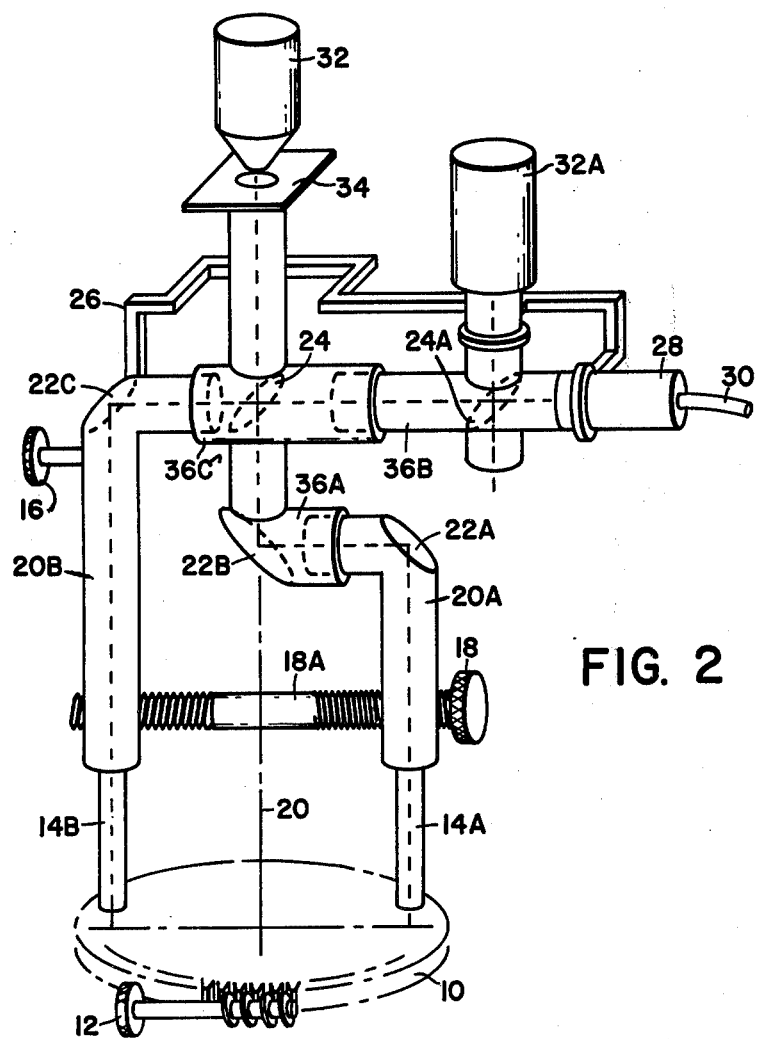
FIG. 2 is a simplified elevational, perspective view (with parts broken away) of the video microscope showing mechanical construction and mechanisms for adjusting spacing of the objective lenses up and down movement for focusing and the viewing plane turntable adjustment.

The optical path lengths shown schematically in FIG. 1 shows that, if the objective lens 3B is moved farther from the centerline 1, the optical path from the image-splitting mirror 5 and the plane mirror 4C is increased. If at the same time, the objective lens 3A is moved farther from the centerline 1, the optical path length from the plane mirror 4A to the plane mirror 4B is increased. This increase in optical path length to the objective lenses 3A and 3B is compensated by the rigid coupling of vidicon tube 9 through the linkage 8 to the mirror 4C. Thus, a lengthening of the optical paths to the mirror 4C, and to the mirror 4B to the mirror 4A is compensated by a shortening of the optical path from the stationary image-splitting mirror 5 to the moving vidicon tube 9. A secondary image splitting mirror may be installed as shown at 5A of FIG. 1. This secondary mirror 5A is also connected to the linkage 8. A mini-CRT or laser unit is installed as shown at 6E in FIG. 1 and is also connected to the linkage 8. The CRT or laser output from the unit 6 goes alone path 6C to the secondary mirror 5A where it is reflected to the main image splitter 5 of FIG. 1. The laser output from the unit 6B (FIG. 1) or 32A (FIG. 2) can be used, for example, to trim thick or thin film resistors located on the table 2 (FIG. 1) or table 10 (FIG. 2). The lower side of the secondary image-splitter mirror 5A may be used to feed a fifth image into the vidicon 9 via the optical path shown at 6 of FIG. 1. This fifth image would come from a third objective lens (not shown). Similarly, if desired, additional objective lenses can be added with corresponding additional image splitters.

FIG. 2 is a perspective, elevational view (with parts broken away) of the image comparison video microscope. Not shown are mounting arrangements which would be used to support the video microscope.

For example, a silicon wafer (not shown) requiring alignment for scribing is mounted on turntable 10 of FIG. 2 which is designed for angular rotation by worm and wheel adjustment mechanism 12. Objective lenses 14A and 14B (or part of the entire video microscope) are focused by a rack and pinion arrangement (not shown) using a control or adjustment wheel 16 which moves the complete microscope unit up and down with reference to the focal plane surface of the turntable 10. Differential movement of the dual objective lenses 14A and 14B to equal distances from the video microscope centerline 20 is accomplished with control or adjustment wheel 18 which turns a RH/LH combined thread lead screw 18A. Not shown are the use of spring loaded nuts on the back of the microscope tubes 20A and 20B which removes backlash while driving the microscope tubes 20A and 20B simultaneously toward and away from the centerline 20. While the embodiment of FIG. 2 shows the use of two microscope tubes and driving mechanism therefor, it should be understood that more than two microscope tubes can be utilized with associated driving mechanisms. Plane mirrors which reflect the images from the objective lenses 14A and 14B to a half-silvered image-splitting mirror 24 are shown at 22A, 22B and 22C. If desirable, redesign of the video microscope can be accomplished so that the objective lens 14A and 14B is fixed with the other lens being movable. Linkage 26 of FIG. 2 (corresponding to linkage 8 of FIG. 1) couples movement of the video microscope tube 20B to vidicon tube 28. A cable for transmitting the video signal to a video amplifier 42 (see FIG. 3A) and for transmitting scanning frequencies from a time base generator 44 (see FIG. 3A) to the vidicon tube 28 is shown at 30.

The light source and condensing lens required to illuminate the video microscope subject matter under the objective lenses 14A and 14B is shown by reference numerals 32 (corresponds to reference numeral 6 of FIG. 1). A slide mounting platform which may be used for introducing a third image into the system is shown at 34 (corresponds to reference numeral 7 of FIG. 1). Slip joints which exclude external light but allow lateral motion of the microscope tubes 20A and 20B to and from the centerline 20 are shown at 36A, 36B and 36C.

A secondary image-splitting mirror is shown at 24A of FIG. 2. This splitter 24A provides the means of introducing the output of a mini-CRT or laser unit 32A into the image system terminating at the objective lenses 14A and 14B. The unused lower part of the splitter mirror 24A provides an optical channel for introducing a fifth image to the vidicon tube 28, if so desired.

Construction and Operation

The optical path length from the objective lens 14A of FIG. 2 or objective lens 3A (FIG. 1) to the image-splitting mirror (5 in FIG. 1 and 24 in FIG. 2) must agree very closely with the optical path length from the objective lens 3B to the mirror 5 (FIG. 1) or from the objective lens 14B to the mirror 24 of FIG. 2. Control 16 in FIG. 2 moves the video microscope with reference to the viewing plane located in the turntable 10 thus focusing the right and left images together.

With respect to FIG. 1, the reflected images from the objective lenses 3A and 3B to the mirror 5 should be perpendicular to the plane of the wafer table 2 at all settings of the differential lead screw controlled by knob 18 (see FIG. 2). This means that the image centerline in the viewing tubes 20A and 20B must remain exactly parallel to all settings of the lead screw controlled by knob 18. The angles of the plane mirrors 22A, 22B and 22C must be set to 45 degrees within one or two seconds of an arc. If desired, optically finished prisms can be used as an alternative to the plane mirrors shown at 22A, 22B and 22C. The planes of the 90 degree parts of the prism must be set exactly perpendicular to the image centerlines coming through the tubes 20A and 20B. These mechanical and optical requirements are to insure perfect registration of the right and left images at all settings of the lead screw controlled by the knob 18 and to prevent double imaging which would interfere with the azimuth setting capability of the video microscope of this invention.

The centerline of the video microscope (1 in FIG. 1 and 20 in FIG. 2) must be exactly positioned over the center of the wafer turntable (2 in FIG. 1 and 10 in FIG. 2). This requirement is to prevent undesired movement of the images when the turntable is rotated by the control mechanism 12.

Other operational applications of the video microscope of this invention may include comparisons of individual circuits or devices on a chip or inspection of circuits or devices for visible defects. The dual or multiple image video microscope of this invention may also have application potential in ballistics comparisons, forensics or biological studies. Further operational applications of the video microscope of this invention may include usage of projected images from the mini-CRT (6B of FIG. 1 or 32 of FIG. 2) as an optical printer on a sensitized medium or to compare an electronically generated image with existing subjects or objects on the focal plane of the table 2 (FIG. 1) or 10 (FIG. 2). This electronically generated image technique could be used to reinforce, regenerate or correct an existing image. A driving source for the mini-CRT may be from the main cathode-ray tube (CRT) viewing unit via cable 46A in FIG. 3, although alternate sources of electronically generated images, such as from unit 48 in FIG. 3, can be provided. As noted above, more than three directly viewed images can be accommodated by adding additional image splitters, objective lenses and associated supporting elements.

If magnification greater than 1200 power is desired, reproduced detail can be improved by operation of the video amplifier 42 (FIG. 3A) and time base generator 44 (FIG. 3A) at 1050 lines per frame at 15 frames per second instead of the conventional 525 lines per frame at 30 frames per second.

Figure 3A:
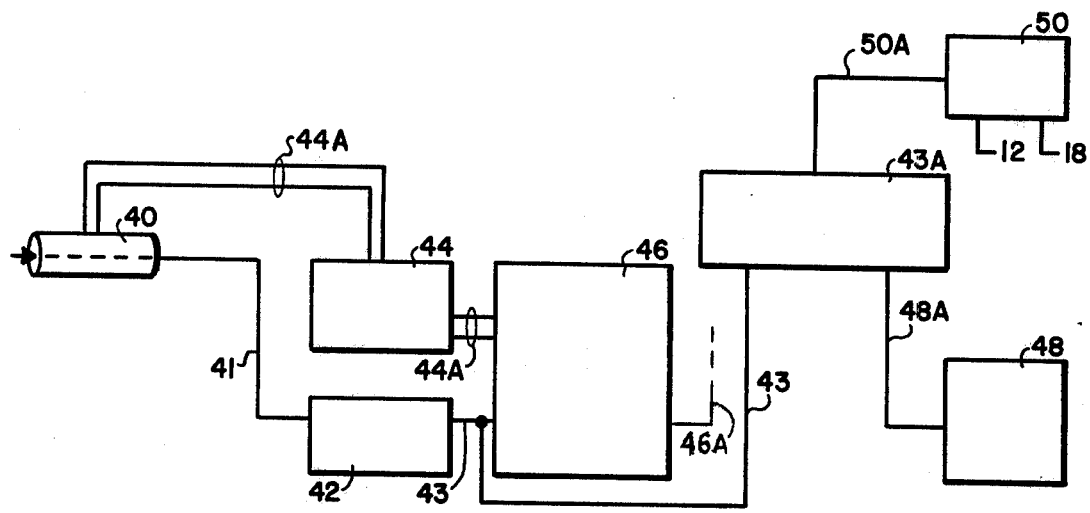
FIGS. 3A and 3B depict block diagrams of electronic functions used for projection (black and white FIG. 3A, color FIG. 3B) of the dual or multiple optical input to the vidicon tube.
Figure 3B:
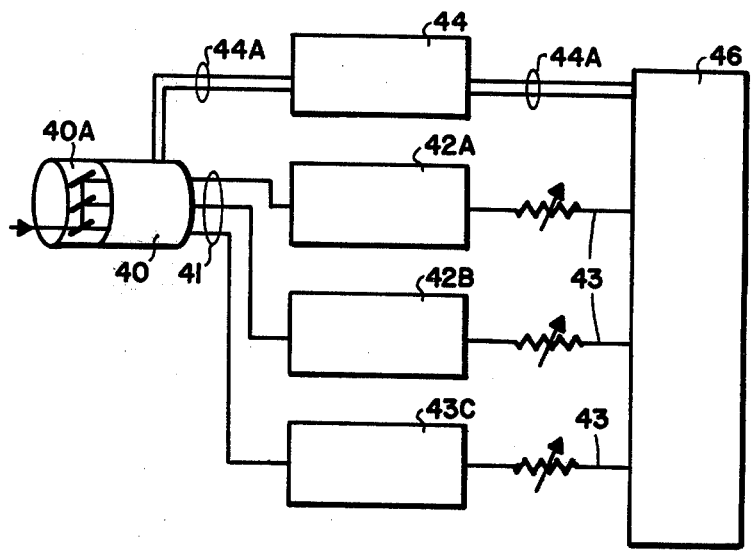

If operational applications would be enhanced by color reproduction, the video microscope of this invention can be adapted to color through usage of the three-channel red, green, blue "RGB" system as shown in FIG. 3B.

Functional Electronic Block Diagram

FIG. 3A is a simplified electronic block diagram showing the technique for processing the output of, for example, a 0.6 inch electrostatically scanned vidicon camera tube 40 and presenting the viewing results on a 12" to 20" (diagonal) monitor cathode-ray tube (CRT) 46. The vidicon camera tube 40 drives the video amplifier 42 using a low capacity cable 41 (30 in FIG. 2). For high definition reproduction, the video amplifier 42 should have a response to 8 Mhz. The output of the video amplifier 42 is connected to the CRT reproduction unit 46 via cable 43. Synchronized line and frame scanning signals are generated by the time base generator 44 which drives the vidicon camera tube 40 and the CRT reproduction unit 46 through cables 44A. If the subjects being viewed are motionless, or relatively so, it would be possible to operate the vidicon unit 40 with a lower frame frequency and a higher line frequency and thus obtain higher definition.

For additional flexibility for the video microscope, the cable 43 also can be used to drive a digitizer unit 43A which could be used if it was necessary for the video microscope to be used in an automatic image comparison mode. The digitizer 43A also receives a signal on cable 48A from unit 48 which is either an actual stored image or an electronically generated image. Cable 50A feeds a null reference comparator 50 which generates servo signals to drive controls or knobs 12 and 18 (see FIG. 2). Within specified limits, a servoed version of the video microscope of this invention will seek out and match images stored in image storage unit 48. Video images from the microscope system may be transferred to any other system or viewing apparatus.

If it is desirable or necessary that the dual or multiple objective video microscope produce images in color, it is possible to accomplish this object with electronics shown in the block diagram in FIG. 3B. The vidicon camera arrangement 40 shown in FIG. 3B preferably consists of three 0.6 inch electrostatically scanned stacked vidicon tubes. The incoming visual signal going into the camera 40 is split into three color components with a dichroic mirror assembly shown in outline form by reference numeral 40A. The input visual signal emerges from the three vidicons as red, green and blue (RGB) signals which are individually amplified by three video amplifiers 42A, 42B and 42C which are driven by three cables 41 from the vidicon unit 40.

The RGB output of the video amplifiers 42A, 42B, 42C is fed to the CRT reproduction unit 46 through three cables 43, which include voltage adjustment resistors, to permit setting of the white level and adjustment of color values.

The CRT reproduction unit 46 may incorporate a three-gun color tube or any of the single gun color tubes. As shown in FIG. 3B, the time base generator 44 drives the vidicon assembly 40 and the CRT reproduction unit 46 through cables 44A.

While the invention has been particularly shown and described in reference to the preferred embodiment thereof, it will be understood by those skilled in the art that changes in the form and details may be made therein without departing from the spirit and scope of the invention.

We claim:

1. An optical vidicon apparatus comprising, in combination, multiple objective lenses, a vidicon optically coupled to said multiple objective lenses, display means coupled to said vidicon to display images received by said vidicon, means for moving at least one of said multiple objective lenses toward and away from at least another of said multiple objective lenses, and means for maintaining the length of the optical path between said one of said multiple objective lenses and said vidicon substantially equal to the length of the optical path between said other multiple objective lenses and said vidicon.

2. An optical vidicon apparatus in accordance with claim 1 wherein said multiple objective lenses comprising two objective lenses, said display means comprising a CRT.

3. An optical vidicon apparatus in accordance with claim 1 wherein said means for moving at least one of said multiple objective lenses toward and away from at least another of said multiple objective lenses comprising means for moving both said one and said other of said multiple objective lenses toward and away from each other.

4. An optical vidicon apparatus in accordance with claim 3 wherein said multiple objective lenses comprising two objective lenses, said display means comprising a CRT.

5. An optical vidicon apparatus in accordance with claim 1 wherein said means for maintaining the length of the optical path between said one of said multiple objective lenses and said vidicon substantially equal to the length of the optical path between said other multiple objective lenses and said vidicon comprising reflecting means located in the optical paths for transmitting the images of objects to said vidicon.

6. An optical vidicon apparatus in accordance with claim 5 wherein said means for maintaining the length of the optical path between said one of said multiple objective lenses and said vidicon substantially equal to the length of the optical path between said other multiple objective lenses and said vidicon further comprising at least one image-splitting means for splitting images received from said multiple objective lenses.

7. An optical vidicon apparatus in accordance with claim 6 wherein said at least one image-splitting means comprising a half-silvered mirror.

8. An optical vidicon apparatus in accordance with claim 7 including light source means optically coupled to said multiple objective lenses for projecting a source of light through said multiple objective lenses onto objects viewed by said multiple objective lenses.

9. An optical vidicon apparatus in accordance with claim 8 wherein said light source means comprising a source of light and a condensing lens coupled to said source of light.

10. An optical vidicon apparatus in accordance with claim 7 including CRT means optically coupled to said multiple objective lenses for projecting an image back through said multiple objective lenses.

11. An optical vidicon apparatus in accordance with claim 7 including laser means optically coupled to said multiple objective lenses for projecting a laser beam back through said multiple objective lenses.

12. An optical vidicon apparatus in accordance with claim 1 including light source means optically coupled to said multiple objective lenses for projecting a source of light through said multiple objective lenses onto objects viewed by said multiple objective lenses.

13. An optical vidicon apparatus in accordance with claim 12 wherein said light source means comprising a source of light and a condensing lens coupled to said source of light.

14. An optical vidicon apparatus in accordance with claim 12 including CRT means optically coupled to said multiple objective lenses for projecting an image back through said multiple objective lenses.

15. An optical vidicon apparatus in accordance with claim 12 including laser means optically coupled to said multiple objective lenses for projecting a laser beam back through said multiple objective lenses.

16. An optical vidicon apparatus in accordance with claim 1 including CRT means optically coupled to said multiple objective lenses for projecting an image back through said multiple objective lenses.

17. An optical vidicon apparatus in accordance with claim 1 including laser means optically coupled to said multiple objective lenses for projecting a laser beam back through said multiple objective lenses.

18. An optical vidicon apparatus in accordance with claim 1 including fixed image means coupled to said light source means for projecting a fixed image back through said multiple objective lenses.

19. An optical vidicon apparatus in accordance with claim 1 wherein said vidicon having means for permitting images viewed by said vidicon received from said multiple objective lenses to be viewed in color.

20. An optical vidicon apparatus in accordance with claim 1 including means coupled to said moving means for the autocorrelation of images viewed by said multiple objective lenses.

21. A method for superimposing and comparing spaced images comprising the steps of:
moving at least one of a multiple of objective lenses toward and away from at least another of the multiple objective lenses;
viewing the multiple images received from the multiple objective lenses with a vidicon;
visually displaying the images received by the vidicon; and
maintaining the length of the optical path between the said one of the multiple objective lenses and the vidicon to be substantially equal to the length of the optical path between said other of the multiple objective lenses and the vidicon.

22. A method in accordance with claim 21 wherein said multiple objective lenses being two.

23. A method in accordance with claim 21 including the steps of illuminating using a light source objects viewed by multiple objective lenses.

24. A method in accordance with claim 23 including the steps of projecting a static image between the light source and the multiple objective lenses to provide a measurement or comparison image.

25. A method in accordance with claim 23 including the step of visually displaying in color the images received from the vidicon.

26. A method in accordance with claim 23 including the step of autocorrelating images viewed by the multiple objective lenses to control the positioning of the multiple objective lenses.

27. A method in accordance with claim 21 including the step of projecting an electronically generated image back through the multiple objective images.

28. A method in accordance with claim 21 including the step of projecting a laser beam back through the multiple objective lenses.

29. A method in accordance with claim 21 including the step of visually displaying in color the images received from the vidicon.

30. A method in accordance with claim 21 including the step of autocorrelating images viewed by the multiple objective lenses to control the positioning of the multiple objective lenses.

* * * * *